US006276500B1

(12) United States Patent
Peasley et al.

(10) Patent No.: US 6,276,500 B1
(45) Date of Patent: Aug. 21, 2001

(54) BRAKE WHEEL CYLINDERS

(75) Inventors: David Peasley, Balsall Common; Clive Samuel Hadley, Knowle, both of (GB)

(73) Assignee: Automotive Products PLC, Leamington Spa (GB)

( * ) Notice: Subject to any disclaimer, the term of this patent is extended or adjusted under 35 U.S.C. 154(b) by 0 days.

(21) Appl. No.: 09/101,255

(22) PCT Filed: Nov. 7, 1997

(86) PCT No.: PCT/GB97/03063

§ 371 Date: Jul. 6, 1998

§ 102(e) Date: Jul. 6, 1998

(87) PCT Pub. No.: WO98/21499

PCT Pub. Date: May 22, 1998

(30) Foreign Application Priority Data

Nov. 9, 1996 (GB) .................................... 9623376

(51) Int. Cl.[7] ............................. F16D 51/00; B60T 11/00
(52) U.S. Cl. ......................... 188/325; 188/361; 188/364
(58) Field of Search ........................... 188/74, 78, 250 A, 188/325, 361, 362, 363, 364, 365

(56) References Cited

U.S. PATENT DOCUMENTS

| 2,084,388 | * | 6/1937 | Dodge | 188/364 |
| 3,200,908 | * | 8/1965 | Budd et al. | 188/78 |
| 4,113,073 | | 9/1978 | Lusa et al. | 188/364 |
| 4,227,594 | * | 10/1980 | Kluger | 188/361 |
| 4,269,533 | * | 5/1981 | Mashiki et al. | 403/410 |
| 4,553,647 | | 11/1985 | Spaargaren | 188/206 |

FOREIGN PATENT DOCUMENTS

| 547826 | | 9/1942 | (GB) . |
| 606355 | | 8/1948 | (GB) . |
| 727 627 | * | 4/1955 | (GB) | 188/361 |

\* cited by examiner

Primary Examiner—Robert J. Oberleitner
Assistant Examiner—Thomas J. Williams
(74) Attorney, Agent, or Firm—Paul E Milliken; Ray L. Weber; Lee A. Germain

(57) ABSTRACT

A drum brake backplate assembly including a wheel cylinder (30) having a tubular body (31) having an axially extending bore (32) within which two brake shoe operating pistons (33) are in sealed sliding contact to define a working chamber (48) therebetween. The pistons are displaceable away from each other along the bore on pressurisation of the working chamber and the body located on an associated brake-backplate (44) by quick-attach means (46).

11 Claims, 1 Drawing Sheet

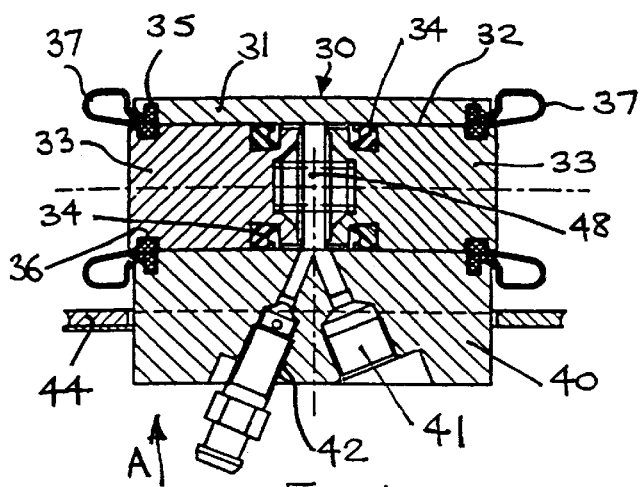
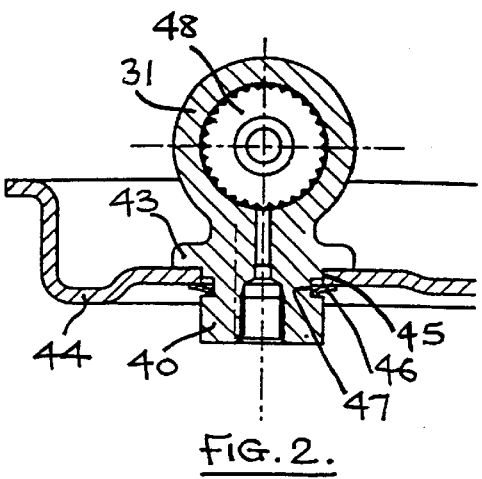
FIG. 1.
FIG. 2.
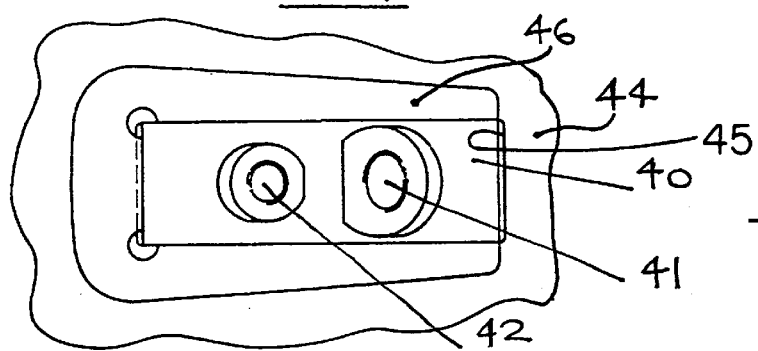
FIG. 3.
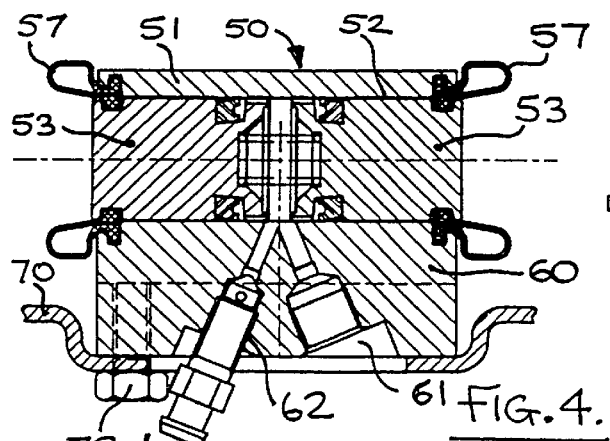
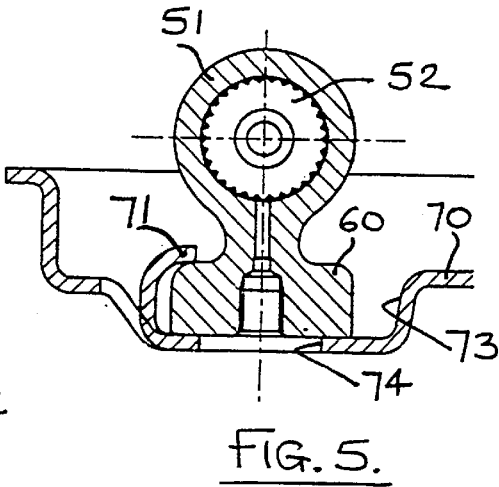
FIG. 4.
FIG. 5.
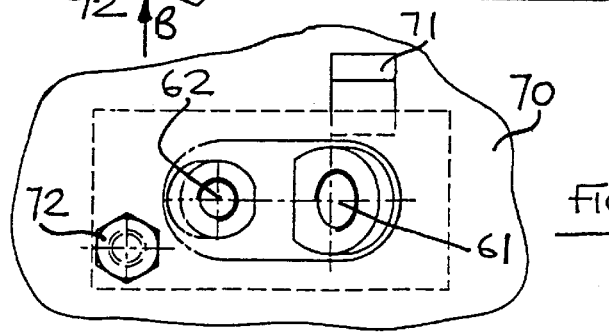
FIG. 6.

BRAKE WHEEL CYLINDERS

This invention relates to drum brake backplate assemblies which include a wheel cylinder mounted on an associated brake backplate.

Traditionally the wheel cylinders for such assemblies are manufactured by producing a cast wheel cylinder body and then subsequently machining the casting to provide an axially extending bore in which brake shoe operating pistons slide. The casting is also machined to provide a fluid inlet and a bleed port for the wheel cylinder and is then bolted to the associated brake backplate.

While such backplate assemblies operate satisfactorily they are relatively expensive to manufacture and require much machining and it is also a relatively time consuming operation to secure such cylinders to, or remove such cylinders from, the associated backplate.

It is an object of the present invention to provide a form of backplate assembly which is cheaper to manufacture than the known designs and in which it is easier to secure the wheel cylinder in its operating position on the associated brake backplate.

Thus according to the present invention there is provided a drum brake backplate assembly comprising a wheel cylinder mounted on a brake backplate, the assembly being characterised in that the wheel cylinder has a body which is shaped to cooperate with quick-attach means which locates the wheel cylinder relative to the brake backplate.

Preferably the quick attach means comprises a clip which engages a formation on the body to hold the body on the backplate.

Preferably also the body is provided with a mounting block which extends through an aperture in the backplate, the clip engaging a formation in the mounting block to hold the body on the backplate.

In a preferred construction the clip is a spring-clip of generally U-shaped form which engages a groove in the mounting block and a rear face of the backplate to hold a shoulder on the mounting block against a front face of the backplate.

In an alternative form of the invention the body is again provided with a mounting block and the clip is formed on the backplate and extends over part of the mounting block and an additional fastening means holds the mounting block under the backplate clip.

The wheel cylinder body is preferably of generally tubular form and is formed as a solid extrusion. Conveniently this extrusion may be formed from aluminium. The extrusion may include the mounting block for the wheel cylinder. The inlet and a bleed passage may both be provided in the mounting block.

The invention also provides a wheel cylinder for use in one form of the backplate assembly described above in which the wheel cylinder body is formed as a solid tubular extrusion which includes a mounting block having a shoulder for contact with the front face of the backplate and a groove therein for receiving the U-shaped spring clip which contacts the rear face of the backplate.

The invention also provides a wheel cylinder for use in the other form of the backplate assembly described above in which the wheel cylinder body is formed as a solid tubular extrusion which includes a mounting block shaped to fit under a clip formed on the backplate, the mounting block also carrying an additional fastening means for holding the mounting block under the clip.

The present invention will now be described, by way of example only, with reference to the accompanying drawings in which:

FIGS. 1 and 2 show longitudinal and radial sections through part of a backplate assembly which has a wheel cylinder manufactured from a length of aluminium extrusion, the wheel cylender being held on the backplate by a U-shaped clip;

FIG. 3 is a partial view in the direction of arrow A of FIG. 1;

FIGS. 4 and 5 are similar views of part of an alternative backplate assembly which has an alternative wheel cylinder produced from an aluminium extrusion in which the cylinder is held on the backplate by a clip and bolt arrangement, and FIG. 6 is a view in the direction of arrow B of FIG. 4.

FIGS. 1 to 3 show a form of the present invention in which a wheel cylinder 30 has a body 31 which is cut from a length of aluminium extruded section. This extruded section has an axially extending bore 32 in which two brake shoe operating pistons 33 are in sealed sliding contact via seals 34 with a working chamber 48 therebetween. Sealing boots 37 are retained between the body 31 and pistons 33 in machined grooves 35 and 36.

The extruded body 31 has a mounting block portion 40 in which an inlet 41 and bleed nipple mounting bore 42 are machined. Part of the mounting block portion 40 is arranged to extend through an aperture 45 in an associated backplate 44 and to be retained in this aperture by a U-shaped clip 46 which engages in a groove 47 in the mounting block and contacts the back face of the-backplate 44 to draw a shoulder 43 provided on the mounting block against the front face of the backplate 44.

As will be appreciated the above construction provides a particularly simple method of providing a wheel cylinder and installing the wheel cylinder on the backplate using the readily attachable and demountable U-shaped clip 46.

A further form of the present invention is shown in FIGS. 4 to 6. Again in this construction the wheel cylinder 50 has a body 51 formed by a section of extruded aluminium having a bore 52 in which two brake shoe operating pistons 53 are in sealed sliding contact. Sealing boots 57 are again provided between the body 51 and the pistons.

The body 51 again has a mounting block portion 60 in which an inlet 61 and bleed nipple bore 62 are machined. The wheel cylinder is retained on the backplate 70 by a lug or clip 71 which extends over part of the mounting block 60 and an additional fastening means in the form of a bolt 72 is screwed through the backplate into the mounting block. The backing plate may be provided with a recess 73 in which the wheel cylinder is mounted and this recess is apertured at 74 to give access to the inlet 61 and bleed nipple bore 62.

As will be appreciated from the above detailed description the present invention provides a simple and relatively cheap method of providing a drum brake backplate assembly which significantly reduces costs and greatly simplifies mounting of the wheel cylinder on the backplate.

What is claimed is:

1. A drum brake backplate assembly including a wheel cylinder having a tubular body defining an axially extending bore, two brake shoe operating pistons in sealed sliding contact with the bore and defining a working chamber therebetween, an inlet extending into the working chamber, the pistons being displaceable away from each other alone the bore on pressurization of the working chamber via the inlet, and a brake backplate on which the wheel cylinder is mounted, the body being cut from a longer length of extruded tubular section which includes longitudinally extending location means extending the full length of the wheel cylinder extrusion in a direction generally parallel to the direction of extension of the bore and including, a mounting block, the mounting block being located on the backplate by a clip which engages the location means.

2. An assembly according to claim 1 characterized in that the mounting block extends through an aperture in the backplate, the clip engaging the location means in the form of longitudinally extending grooves in the mounting block to hold the body on the backplate.

3. An assembly according to claim 2 characterized in that the clip is a spring-clip of generally U-shaped which engages the grooves in the mounting block and a rear face of the backplate to hold a shoulder on the mounting block against a front face of the backplate.

4. An assembly according to claim 1 characterized in that the backplate is provided with the clip integral therewith which extends over location means on the mounting block and an additional fastening means holds the mounting block under the clip on the backplate.

5. An assembly according to claim 4 characterized in that the mounting block is secured in a depression in the backplate.

6. An assembly according to claim 1 characterized in that the extrusion is formed from aluminum.

7. An assembly according to claim 1 characterized in that the mounting block includes the inlet.

8. An assembly according to claim 7 characterized in that the mounting block also includes a bleed passage.

9. A wheel cylinder for use in an assembly according to claim 2 characterized in that the wheel cylinder body is formed as a tubular extrusion which includes a mounting block having a shoulder for contact with the front of the backplate and longitudinally extending grooves therein for receiving the clip, the clip contacting the rear face of the backplate.

10. A wheel cylinder for use in an assembly according to claim 4 characterized in that the wheel cylinder body is formed as a tubular extrusion which includes a mounting block shaped to fit under the clip on the backplate, the mounting block also carrying an additional fastening for holding the mounting block under the backplate clip.

11. A drum brake backplate assembly including a wheel cylinder having a tubular body defining an axially extending bore, two brake shoe operating pistons in sealed sliding contact with the bore and defining a working chamber therebetween, an inlet extending into the working chamber, the pistons being displaceable away from each other along the bore on pressurization of the working chamber via the inlet, and a brake backplate on which the wheel cylinder is mounted, the body being cut from a longer length of extruded tubular section which includes longitudinally extending locating grooves extending the full length of the wheel cylinder extrusion in a direction generally parallel to the direction of extension of the bore and including a mounting block, the mounting block being located on the backplate by generally U-shaped clip means, the clip means being engaged with the locating grooves on the opposite side of the backplate to the mounting block by movement of the clip means in said direction generally parallel to the direction of extension of the bore.

* * * * *